Patented May 22, 1951

2,553,544

UNITED STATES PATENT OFFICE 2,553,544

ENTERIC VITAMIN PREPARATIONS

Herman H. Bogin, Detroit, Mich., assignor to Parke, Davis & Company, Detroit, Mich., a corporation of Michigan No Drawing. Application June 2, 1947, Serial No. 751,987

7 Claims. (Cl. 167—81)

The invention relates to a solid, enteric therapeutic product and to a method for preparing the same. More particularly, the invention relates to a solid enteric product containing a therapeutic oil. The invention, in its preferred form, is concerned with the preparation of a stable, solid vitamin preparation having enteric properties and containing vitamin A and/or D oils.

In general, medicinal substances are more readily utilized and are of greater therapeutic value if they are absorbed from the upper portion of the intestine. Medical science has long sought to provide efficient means for rendering such substances available for absorption from the intestinal tract. This problem arises from the fact that many medicinals are either not absorbed from the stomach or rapidly destroyed on contact with the acid present in the stomach. Many medicinals are also very unpleasant to take and cause severe gastric disturbances which may be coupled with very unpleasant regurgitation of the drug. In addition to not being absorbed from the stomach, the oil-soluble vitamins derived from fish liver oils, i. e. vitamins A and/or D, possess a notoriously unpleasant taste and commonly cause gastric disturbances which result in regurgitation with its accompanying disagreeable fishy taste. While the initial taste can be overcome by enclosing the vitamin-containing oil in a gelatin capsule, the vitamin oil released by the breakdown of the capsule in the stomach produces the same gastric disturbances as are obtained when the oil is administered as such.

Vitamins A and/or D, being available only in the form of water-immiscible liquids, i. e. oils, are not amenable to the customary methods used in preparing enteric pills, tablets and powders from solid medicinals. Various proposals have been made for converting these vitamin oils to solid products. These methods consist in adsorbing the oil on diluents, powders and similar materials; mixing it with greases, waxes or fats; or incorporating it in gel-like materials such as gelatin. However, none of these solid products possess enteric properties and, as far as I am aware, there is no known method for converting a water-immiscible liquid medicinal to a homogeneous, solid, enteric product.

It is an object of this invention to provide homogeneous, solid vitamin products possessing enteric properties and containing vitamins A and/or D.

Another object of the invention is to provide homogeneous, solid, enteric, vitamin A and/or D products in the form of small, discrete particles or granulations.

It is also an object of the invention to provide homogeneous, solid, enteric vitamin A and/or D products possessing a high degree of stability against oxidative deterioration.

These and other objects, hereinafter more fully disclosed, are realized by dispersing or emulsifying a vitamin A and/or D oil in an aqueous mixture comprising gelatin and a water-soluble, alkali metal carboxylate salt of a partial ester of a polycarboxylic acid and a suitable cellulose ester, drying the resulting emulsion to the solid state in the form of thin sheets, pulverizing the solid material and removing any uncoated vitamin oil from the surface of the granulated vitamin so obtained with an organic solvent for the vitamin oil.

A preferred modification of my process for obtaining these valuable granulated enteric vitamin products involves the use of a plasticizer in the aqueous gelatin-cellulosic salt mixture. I have found that the plasticizer not only serves as an excellent inert substitute for a portion of the more expensive gelatin but also increases the ability of the enteric mixture to cover the minute oil droplets. The plasticizer also tends to reduce the amount of vitamin oil liberated during the grinding process because of the pliability which it imparts to the sheet form of the dried product. The plasticizers which I use in this phase of my invention are sugars or sugar alcohols such as sucrose, glucose, invert sugar, sorbitol and the like. These plasticizers may be used either in pure crystalline form or as the cheaper commercially available syrups, e. g. corn syrup, strained honey, molasses and the like.

The emulsification of the water-immiscible vitamin oil in the aqueous enteric mixture can be effected in a number of different ways. For example, it may be carried out simply by very rapid stirring of the somewhat viscous mixture or, if very rapid emulsification is desired, a mechanical homogenizer may be used. In general, the temperature of the mixture during this step of the process should be slightly above room temperature and preferably in the neighborhood of about 110 to 125° F. In order to lessen the oxidation of the vitamin during the emulsification it is also preferable to blanket the warm mixture with an inert gas such as carbon dioxide, nitrogen or methane.

A wide variety of organic solvents may be used to remove any liberated vitamin oil from the surface of the final product. Some of the more common organic solvents for the vitamin oils which are particularly useful for this purpose are benzene, toluene, petroleum ether, acetone, ethanol and the like.

The proportions of the various components of my new vitamin products can be varied within rather large limits without deleterious effect upon the enteric properties of the product. The percentage of the gelatin, the main binding agent in the enteric matrix containing the minute vitamin oil droplets, may be varied between about 15 to 75%. When over about 75% gelatin is used the enteric properties of the product are lost due to solution of the gelatin in the stomach; while if less than about 15% gelatin is used the enteric matrix does not possess the requisite covering properties due to the lack of binding agent. In the preferred modification of my new products a sugar or sugar alcohol type plasticizer is substituted for a portion of the gelatin. These plasticizers may comprise any percentage of the final product up to about 45% providing that this amount does not exceed about two and a half times the amount of gelatin used. In the preferred products of the invention the gelatin and plasticizer constitute between about 50 to 65% of the product, the plasticizer being no more than two-thirds of this percentage.

The component which imparts the enteric properties is the cellulosic carboxylate salt. It may be present in percentages between about 3 and 20%, the preferred percentage being from about 5 to 7%. If less than about 3% of this material is employed the product lacks the necessary insolubility in the stomach acids, while if more than about 20% is present the binding properties of the gelatin are lost and the dried product crumbles and breaks releasing the entrapped vitamin oil. The vitamin oil may constitute any amount of the final product up to about 50% depending, of course, upon the vitamin potency desired. Over 50% of the vitamin oil is undesirable due to the fact that in the emulsification step of the process, the vitamin oil may become the external or continuous phase. Even when this difficulty is not encountered the product may not contain a sufficient amount of the enteric mixture to protect the vitamin oil from oxidation and to render the product insoluble in the stomach acids. In practice a vitamin oil content of about 35 to 40% has been found to be particularly advantageous in that such products are high in potency and easy to produce.

The compositions of the preferred products is as follows:

| | Per cent |
|---|---|
| Gelatin | 20 to 35 |
| Plasticizer | 20 to 40 |
| Cellulosic carboxylate salt | 5 to 7 |
| Vitamin A and/or D oil | 35 to 40 |

The new vitamin products of the present invention are free flowing, non-tacky granulations in which the vitamin oil is evenly dispersed in the form of minute droplets in the enteric matrix. They are extremely resistant to attack by stomach acids but are rapidly disintegrated, with the release of the entrapped vitamin oil, on contact with the alkaline medium of the intestine. The rapid alkaline disintegration of these enteric products is extremely important since it insures the release of the medicament in the upper or absorptive zone of the intestine. Another characteristic property of these new vitamin products is their extremely high degree of stability against oxidative deterioration. For example, the granulations containing the very unstable vitamin A can be heated at elevated temperatures in the presence of air for months without significant diminution in the vitamin potency while the untreated vitamin oil under these same conditions loses a substantial amount of its activity within a few hours.

The cellulosic alkali metal carboxylate salts used in the preparation of my new products are prepared by reacting the corresponding cellulosic derivative containing free carboxyl groups with an alkali metal carbonate, bicarbonate, oxide or hydroxide. The unneutralized cellulosic compounds are prepared, for example, by the methods described in United States Patents Nos. 2,093,462, 2,093,464 and 2,126,460. Of these polycarboxylic acid partial esters of cellulose esters of lower aliphatic monocarboxylic acids, I prefer those derived from an aromatic polycarboxylic acid such as phthalic acid and an aliphatic acid such as acetic, propionic, butyric and the like acids. Some examples of the preferred esters are cellulose - acetate - phthalate, cellulose - propionate-phthalate, cellulose-butyrate-phthalate and the like. The esters which I use do not need to contain a free carboxyl group in each polycarboxylic acid portion of the molecule but they should contain between about 5 to 25% free carboxyl groups by weight. A free carboxyl group content of between about 8 and 15% has been found to be preferable as the products produced from such esters dissolve rapidly on contact with the alkaline secretions of the intestines.

The invention is illustrated by the following example.

A finely divided mixture consisting of 10.5 g. of sodium bicarbonate monohydrate and 42 g. of cellulose - acetate - phthalate (—COOH content about 11%) is added with stirring to 290 g. of hot water and the mixture stirred until solution is complete. In a separate container 216 g. of granulated sucrose is dissolved in 610 g. of hot water and 330 g. of gelatin (Bloom 200 g.; viscosity 46 centipoises and pH 4.5) soaked in the resultant solution for about two hours. The gelatin is melted and the solution stirred until it is homogeneous. The aqueous solution of the sodium salt of cellulose acetate phthalate is added with stirring to the plasticized gelatin solution at about 120° F. and the warm mixture stirred until it is homogeneous. 412 g. of a vitamin A and D concentrate containing 652,000 units of vitamin A and 65,000 units of vitamin D per gram is added slowly to the warm gelatin-salt mixture and the resulting mixture emulsified by increasing the speed of the agitator or by the use of a suitable mechanical homogenizer. During the addition of the vitamin oil and the emulsification of the oil in the warm aqueous mixture the mixture is preferably blanketed with carbon dioxide or nitrogen gas in order to prevent unnecessary oxidative deterioration of the vitamin A.

After emulsification is complete the mixture is run off into thin sheets (about 0.020 inch in thickness) in pans and dried at about 100° F. for eighteen hours in an atmosphere having a low relative humidity, e. g. on the order of about 20%. The dried sheets are ground to about a 40 mesh granulation in any suitable grinding apparatus, e. g. a revolving hammer type mill, coffee mill or the like and the resulting granulation freed from any vitamin oil liberated during the grinding process by washing it with about 1500 cc. of benzene. The benzene is evaporated from the washings and the recovered vitamin oil used in a subsequent run. The amount of oil recovered at this point in the process depends largely on the degree of emulsification obtained in the emulsification step and varies from as low as 5% to about 40% of the total amount of vitamin oil used.

The granulated vitamin product obtained after evaporation of any adhering benzene is light yellow in color and weighs about 1000 g. This solid, homogeneous, enteric product contains 134,000 units of vitamin A per gram by spectrographic analysis and 112,000 units of vitamin A and 13,000 units of vitamin D per gram by biological assay in rats.

To test the enteric properties of these new vitamin preparations, conditions simulating the human body as closely as possible are used. To simulate the acidic conditions in the stomach, a 0.25% hydrochloric acid solution containing 0.04% pepsin is used, while the alkaline conditions of the intestines are reproduced by the use of a 2% sodium bicarbonate solution. Both the acid and alkaline tests are carried out at 37° C., i. e. approximately body temperature. The enteric granulations of the present invention do not dissolve or disintegrate with the liberation of the enclosed vitamin oil for several hours when subjected to the acid treatment. However, under the alkaline test conditions these same granulations disintegrate within a few minutes to completely liberate the vitamin oil.

These new enteric vitamin products possess a remarkable degree of stability against oxidative deterioration. Tests performed upon the product produced by the method described above show that this product loses only about 10% of its vitamin A potency when heated at 100° F. in a stream of air for two to three months or longer whereas under the same conditions the original vitamin oil loses over 20% of its vitamin A activity within about twenty hours.

The granulated vitamin products of the present invention may be administered as such or in encapsulated form, i. e. contained in suitable gelatin capsules. Regardless of the method of administration the product of the above example does not cause any gastric discomfort and does not produce the undesirable fishy taste so often experienced due to the regurgitation of vitamin products containing vitamins A and/or D.

It should be understood, of course, that other cellulosic esters such as cellulose-propionate-phthalate and the like can be substituted for the cellulose-acetate-phthalate used in the above example and that the sucrose plasticizer can be replaced with sorbitol, glucose, invert sugar, corn syrup and the like.

What I claim as my invention is:

1. A solid, enteric therapeutic product comprising a homogeneous mixture of gelatin, a water-soluble alkali metal carboxylate salt of a partial ester of a polycarboxylic acid and a cellulose ester of a lower aliphatic monocarboxylic acid, and a water-immiscible therapeutic oil.

2. A solid, enteric therapeutic product comprising a homogeneous mixture of gelatin, a water-soluble alkali metal carboxylate salt of cellulose-acetate-phthalate and a water-immiscible therapeutic oil.

3. A solid, enteric therapeutic product comprising a homogeneous mixture of about 15 to 75% gelatin, about 3 to 20% of a water-soluble alkali metal carboxylate salt of cellulose-acetate-phthalate, and up to about 50% of a water-immiscible vitamin oil.

4. A solid, enteric vitamin product comprising a homogeneous mixture of about 15 to 75% gelatin, about 3 to 20% of a water-soluble alkali metal carboxylate salt of cellulose-acetate-phthalate and not more than about 50% of a vitamin A oil.

5. A solid, enteric vitamin product comprising a homogeneous mixture of about 15 to 75% plasticized gelatin containing not more than two-thirds by weight of a sugar alcohol as a plasticizer, about 3 to 20% of a water-soluble alkali metal carboxylate salt of cellulose-acetate-phthalate and not more than about 50% of a vitamin A oil.

6. A solid, enteric vitamin product comprising a homogeneous mixture of about 15 to 75% plasticized gelatin containing not more than two-thirds by weight of a sugar as a plasticizer, about 3 to 20% of a water-soluble alkali metal carboxylate salt of cellulose-acetate-phthalate and not more than about 50% of a vitamin A oil.

7. A solid, enteric vitamin product comprising a homogeneous mixture of about 15 to 75% plasticized gelatin containing not more than two-thirds by weight of sucrose as a plasticizer, about 3 to 20% of a water-soluble alkali metal carboxylate salt of cellulose-acetate-phthalate and not more than about 50% of a vitamin A oil.

HERMAN H. BOGIN.

REFERENCES CITED

The following references are of record in the file of this patent:

UNITED STATES PATENTS

| Number | Name | Date |
| --- | --- | --- |
| 2,196,768 | Hiatt | Apr. 9, 1940 |
| 2,218,592 | Taylor | Oct. 22, 1940 |
| 2,390,088 | Fox | Dec. 4, 1945 |
| 2,410,110 | Taylor | Oct. 29, 1946 |
| 2,410,417 | Andersen | Nov. 5, 1946 |